UNITED STATES PATENT OFFICE.

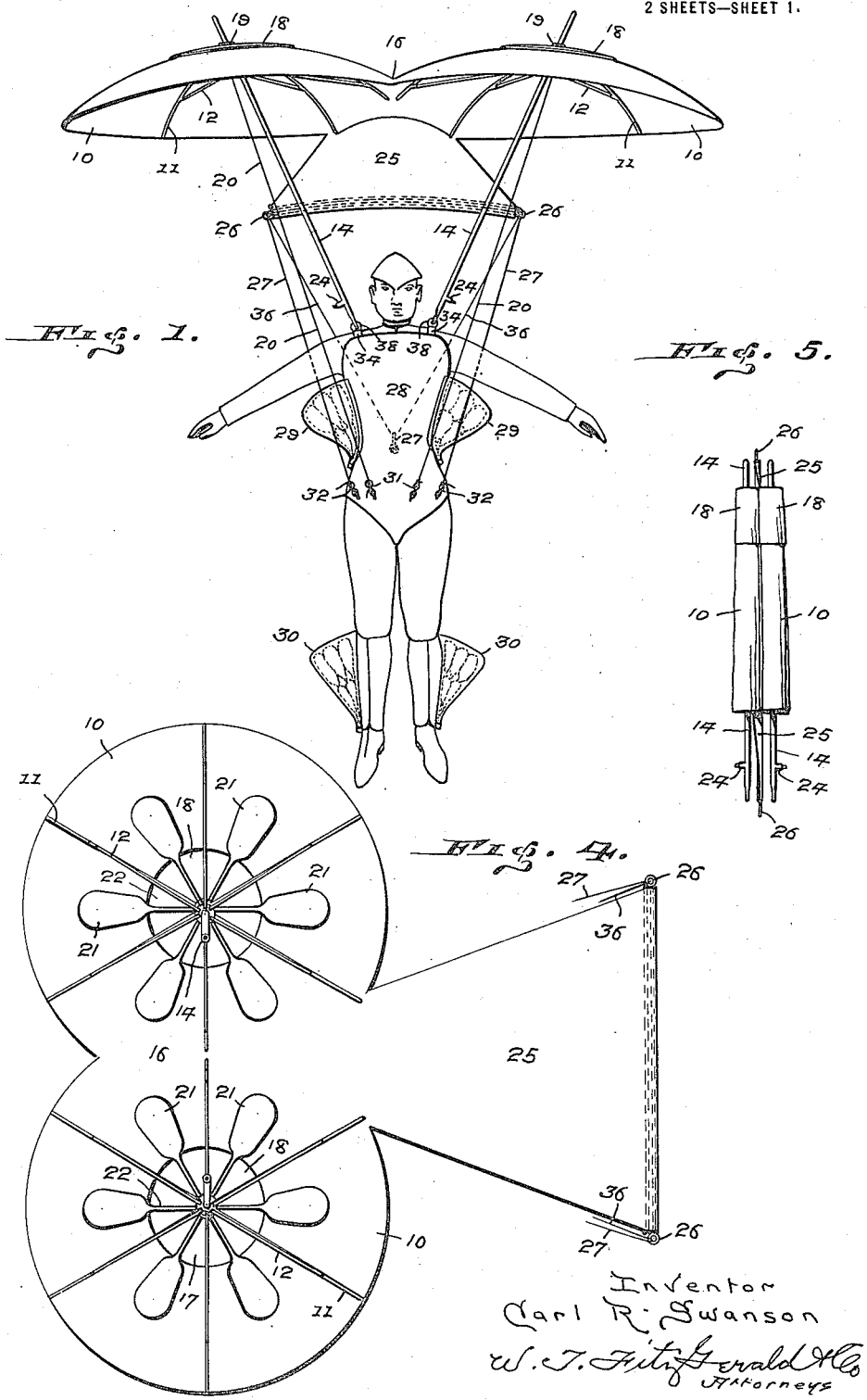

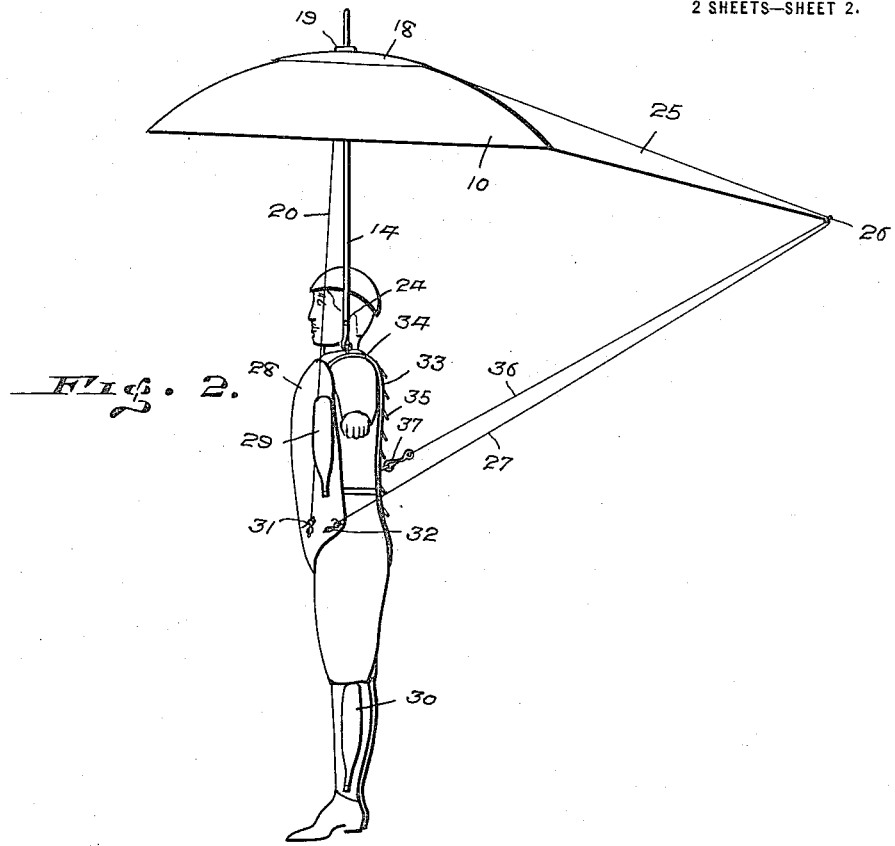
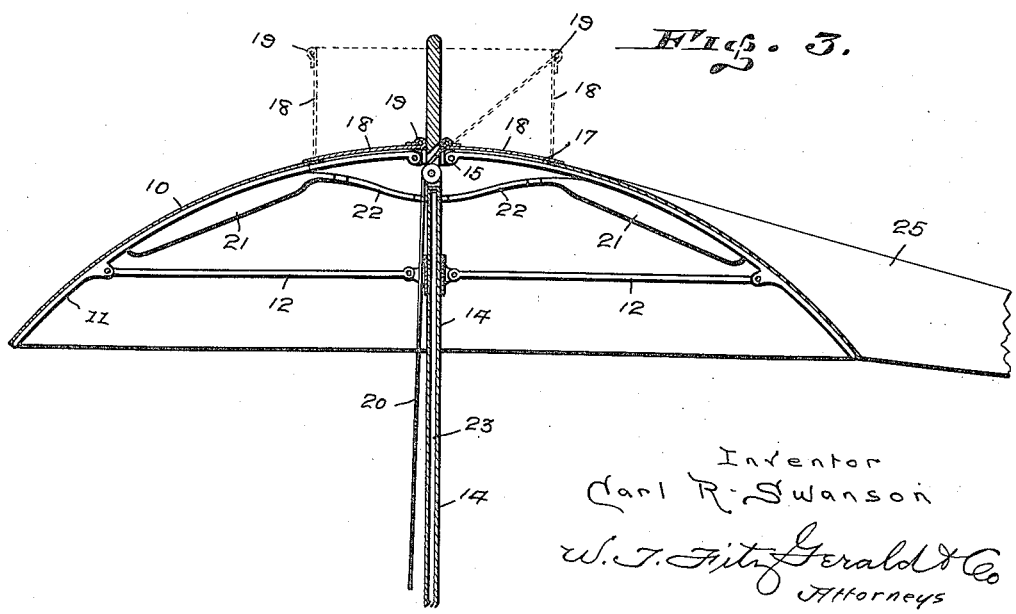

CARL R. SWANSON, OF MARSHALL, MINNESOTA.

PARACHUTE.

1,287,134.  Specification of Letters Patent.  Patented Dec. 10, 1918.

Application filed June 3, 1918. Serial No. 237,942.

*To all whom it may concern:*

Be it known that I, CARL R. SWANSON, a citizen of the United States, residing at Marshall, in the county of Lyon and State of Minnesota, have invented certain new and useful Improvements in Parachutes; and I do hereby declare the following to be a full, clear, and exact description of the invention, such as will enable others skilled in the art to which it appertains to make and use the same.

This invention relates to a parachute and particularly to a construction adapted to support and control the direction of descent of an aviator wearing such a device.

The invention has for its object to provide a novel and improved construction of parachute having means for permitting the passage of air therethrough to control the descending movement and also a sail member by which the direction of said movement may be controlled.

A further object of the invention is to provide a novel construction of a parachute member comprising buoyant inflatable members carried thereby and a manually controlled relief opening at its upper portion whereby the device may be controlled to support the aviator in the air and also permit his descent when desired.

Other and further objects and advantages of the invention will be hereinafter set forth and the novel features thereof defined by the appended claims.

Figure 1 is a front elevation showing the parachute applied in use.

Fig. 2, a side elevation thereof.

Fig. 3, a detailed enlarged vertical section of the parachute member.

Fig. 4 is a plan of the underface of the parachute shown in Fig. 1, and

Fig. 5, a detail showing the parachute members folded.

Like numerals refer to like parts in the several figures of the drawings.

The numeral 10 designates a parachute, of the umbrella type, which may be of any desired material, construction or configuration and is here shown as supported upon the ribs 11 from which braces 12 extend to the sliding collar mounted upon the tubular support or connecting rod 14. These ribs 11 are pivoted at their upper ends 15 so that the entire structure may be folded from the position shown in Fig. 3 to that shown in Fig. 5.

In the drawings a plurality of the parachute members is shown but a single one may be used if desired as these members are substantially identical in construction and when two are used, as shown in Figs. 1 and 4, they may be joined at their meeting edges 16.

Each of the parachute members is provided at its central portion with a relief opening 17 which may be closed by any preferred construction of valve member, for instance, a fabric 18 secured to the parachute cover and having at its free edge a draw string 19 by which it may be normally retained in the position shown by full lines in Fig. 3 by tension upon the controlling cable or line 20. When this cable is released by the aviator the passage of air through the parachute causes the fabric valve to rise to the position shown by dotted lines in Fig. 3 and control the descent of the parachute.

Under certain conditions of use it is desirable to support the aviator in a position above the ground and for this purpose inflatable gas bags 21 are attached to the inner face of the parachute and connected by tubes 22 with the hollow interior 23 of the support 14. These bags may be inflated through a check valve controlled opening 24 upon the tubes as indicated in Fig. 1.

For the purpose of controlling the direction of the descent of the parachute and also adding additional buoyancy thereto a sail member 25 is shown extending rearwardly therefrom the outer edge 26 thereof being suitably braced to retain the sail in extended position. From the ends of this brace controlling lines 27 extend to a convenient position for operation by the aviator to tilt the end of the sail. These lines 27 and also the cables 20 controlling the relief valves may be connected to the aviator in any desired manner, for instance, I have shown a breast plate 28 provided with inflatable members 29 substantially as shown in my application for patent filed October 9, 1917, Serial No. 195,545. The aviator may also be provided adjacent his feet with the inflatable bag members 30 as described in said application. This breast plate 28 is provided with the connection 31 for the cable 20 and a similar connection 32 for the line 27 both of which are readily accessible to the hand of the aviator. It is also desirable to brace and adjust the angle of inclination of the sail member and parachute relative to the operator and this may be very conveniently accomplished by means of a back plate 33 connected to the breast plate 28 by shoulder straps 34. This back plate 33 is provided with a series of loops 35 with which the controlling cable 36 extending from the braced edge of the sail may be connected by any preferred means, for instance, a snap hook 37. The supports 14 may be also connected with the suit of the aviator in any desired manner, for instance, by means of a pivotal connection 38 with the shoulder straps 34 which permits the deflection of the parachute and sail at an angle to the aviator by a proper adjustment of the connecting cables and thus the direction and extent of his descent is controlled relative to the wind pressure or other atmospheric conditions.

The sail member is adapted to be bodily adjusted in its inclination relative to the parachute support and the wearer by means of the controlling lines extending from opposite sides thereof to the snap hook attached to the wearer and being free for movement through the eye of this hook. The tilting or draw lines 27, are each independent and extend to the opposite ends of the sail so as to effect a tilting of the ends thereof, causing one end to be lowered and the other to be raised, which movement is permitted by the sliding of the line 36. This arrangement adapts the sail to be adjusted to steer or guide the operator in his descending movement.

In the operation and use of this invention the aviator may ascend to any desired height by an aeroplane or other means with the parachute in folded position. When he is ready to descend it is only necessary to connect the parachute members with the breast and back plates as shown and to drop from the aeroplane. The buoyant members carried by the aviator and the parachute are sufficient to support the aviator after leaving the aeroplane and he can then control his descent by means of the relief valve which permits more or less air to pass through the parachute and diminishes the supporting or buoyant capacity thereof. The sail and parachute may also be adjusted relative to the aviator so as to control the direction of his descent under different conditions of wind or atmospheric pressure and he may at all times control the direction of the sail member relative to the parachute when the latter is held in vertical position by the air pressure due to the descending travel. The invention is particularly adapted for military uses as the arms of the aviator are left free for the use of any weapon which he may carry and he can be supported at a safe distance above the enemy's lines so as to operate against them from the air. A soldier may also be transported to the rear of the enemy's lines and then partially or completely descend to a position so as to attack the enemy from the rear. The invention also provides means by which an aviator or soldier may pass over swampy or flooded ground or even bodies of water and still continue his operations against the enemy. The method of attaching the parachute to the aviator permits it to be readily detached when he lands upon the ground so that he can proceed independent thereof when conditions render it desirable.

The construction shown provides a simple, convenient and economically manufactured parachute apparatus the details of which may be changed or altered without affecting the spirit of the invention as defined in the appended claims.

What I claim is:

1. A parachute comprising a covered supporting frame, means for mounting said frame, a sail member extending rearward from and flexibly connected with the edge of said parachute, means for controlling the inclination of said sail, and coacting means for tilting the opposite ends of said sail when in inclined position.

2. A parachute comprising a covered supporting frame having a central opening, a tubular flexible valve surrounding said opening and secured at one edge thereto, and an operating cable extending through the free edge of said valve.

3. A parachute comprising a covered supporting frame, a plurality of inflatable members secured to the under surface of said frame, a tubular supporting standard having a valved inlet at its lower portion, means upon the standard to open and close said frame, tubes communicating with said members and the interior of the upper portion of said standard, and means for mounting said standard upon the body of a wearer.

4. A parachute comprising a covered supporting frame, a plurality of inflatable members secured to said frame, a tubular supporting standard, means communicating with said members and the interior of said standard, means for pivotally mounting said standard upon the body of a wearer, and means for controlling the position of said parachute relative to the wearer.

5. A parachute comprising a covered supporting frame, a plurality of inflatable members secured to said frame, a tubular supporting standard, means communicating with said members and the interior of said standard, means for pivotally mounting said standard upon the body of a wearer, and an adjustable line extending from said parachute to the body of a wearer.

6. The combination of a parachute, a sail member extending rearwardly from the edge thereof and having a braced free edge, independently operable tilting lines extending from the body of a wearer to the opposite ends of said free edge, and adjustable jointly operable draw lines extending from said ends to the body of a wearer to effect a lateral inclination of said sail member.

7. The combination of a parachute, a sail member extending rearwardly from the edge thereof and having a braced free edge, independently operable tilting lines extending from the body of a wearer to the ends of said free edge, jointly operable draw lines extending from said edge to the body of a wearer to incline said sail, and a back plate adapted to be attached to a wearer and having a plurality of vertically disposed devices for adjustably connecting the draw lines.

8. The combination of a breast plate, a back plate, connecting shoulder straps, supporting standards pivotally connected to said straps, parachute members foldably mounted upon the upper ends of said standards and provided with an opening therein, and a relief valve for controlling said opening.

9. The combination of a breast plate, a back plate, connecting shoulder straps, supporting standards pivotally connected to said straps, parachute members foldably mounted upon the upper ends of said standards and provided with an opening therein, a relief valve for controlling said opening, an operating cable extending from said valve to the breast plate, and a sail member extending rearwardly from said parachute members.

10. The combination of a breast plate, a back plate, connecting shoulder straps, supporting standards pivotally connected to said straps, parachute members foldably mounted upon the upper ends of said standards and provided with an opening therein, a relief valve for controlling said opening, an operating cable extending from said valve to the breast plate, a sail member extending rearwardly from said parachute members, a retaining line extending from the free edge of said sail and adjustably connected to said back plate, and draw lines extending from said edge to said breast plate.

11. The combination of a breast plate, a back plate, connecting shoulder straps, supporting standards pivotally connected to said straps, parachute members foldably mounted upon the upper ends of said standards and provided with an opening therein, a relief valve for controlling said opening, an operating cable extending from said valve to the breast plate, a sail member extending rearwardly from said parachute members, a retaining line extending from the free edge of said sail and adjustably connected to said back plate, draw lines extending from said edge to said breast plate, and buoyant members attached to said parachutes and communicating with a passage through said supporting standards.

In testimony whereof I have signed my name to this specification in the presence of two subscribing witnesses.

CARL R. SWANSON.

Witnesses:
ALFRED T. GAGE,
W. M. RITCHIE.